(12) United States Patent
Akimoto et al.

(10) Patent No.: US 11,775,881 B2
(45) Date of Patent: Oct. 3, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Nana Akimoto, Kanagawa (JP); Teppei Aoki, Kanagawa (JP); Izumi Nakano, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 512 days.

(21) Appl. No.: 16/744,203

(22) Filed: Jan. 16, 2020

(65) Prior Publication Data

US 2021/0027211 A1    Jan. 28, 2021

(30) Foreign Application Priority Data

Jul. 24, 2019    (JP) .................................. 2019-135835

(51) Int. Cl.
  *G06F 3/048*    (2013.01)
  *G06Q 10/02*    (2012.01)
  *G06F 3/0482*    (2013.01)
  *H04L 51/02*    (2022.01)

(52) U.S. Cl.
  CPC ........... *G06Q 10/02* (2013.01); *G06F 3/0482* (2013.01); *H04L 51/02* (2013.01)

(58) Field of Classification Search
  CPC .................................................. G06Q 10/02
  See application file for complete search history.

(56) References Cited

U.S. PATENT DOCUMENTS

| | | | | |
|---|---|---|---|---|
| 2009/0204319 A1* | 8/2009 | Shanbhag | ............... | G06F 16/29 707/999.005 |
| 2009/0254840 A1* | 10/2009 | Churchill | ................ | H04L 51/04 715/753 |
| 2019/0086223 A1* | 3/2019 | Tanaka | ............. | G08G 1/096872 |
| 2019/0130314 A1 | 5/2019 | Baba | | |
| 2019/0187949 A1* | 6/2019 | Sugimoto | ............... | G07F 17/26 |

FOREIGN PATENT DOCUMENTS

| | | |
|---|---|---|
| JP | 2002098537 | 4/2002 |
| JP | 2002197329 | 7/2002 |
| JP | 2005141657 | 6/2005 |
| JP | 2010118019 | 5/2010 |
| JP | 2011191997 | 9/2011 |
| JP | 2014099146 | 5/2014 |
| JP | 2014211852 | 11/2014 |
| JP | 2018045694 | 3/2018 |
| JP | 2019079403 | 5/2019 |

OTHER PUBLICATIONS

"Office Action of Japan Counterpart Application", dated Jun. 6, 2023, with English translation thereof, p. 1-p. 8.

* cited by examiner

*Primary Examiner* — Claudia Dragoescu
(74) *Attorney, Agent, or Firm* — JCIPRNET (57) ABSTRACT

An information processing apparatus includes a control section that performs control to display a facility display map including plural display elements indicating plural facilities in a conversation screen displaying a conversation between a system and an operator, and a processing section that, in response to an operation by the operator to select one display element from among the plurality of display elements on the facility display map, performs processing for reserving a facility indicated by the one display element.

11 Claims, 11 Drawing Sheets

| FACILITY ID | POSITION INFORMATION | RESERVATION STATE INFORMATION | | | | | | | |
|---|---|---|---|---|---|---|---|---|---|
| | | ... | ... | x MONTH x DATE | | | | | ... |
| | | | | 13:00 | 13:15 | 13:30 | 13:45 | 14:00 | ... |
| A | $(X_1, Y_1)$ | ... | ... | × | ○ | ○ | ○ | ○ | ... |
| B | $(X_2, Y_2)$ | ... | ... | ○ | ○ | ○ | × | ○ | ... |
| C | $(X_3, Y_3)$ | ... | ... | × | × | × | × | × | ... |
| D | $(X_4, Y_4)$ | ... | ... | ○ | ○ | ○ | ○ | ○ | ... |
| ... | ... | ... | ... | ... | ... | ... | ... | ... | ... |

FIG. 10

FIG. 11

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-135835 filed Jul. 24, 2019.

BACKGROUND

(i) Technical Field

The present invention relates to an information processing apparatus and a non-transitory computer readable medium storing a program.

(ii) Related Art

A facility information providing apparatus that, when there is access from a user, searches for an appropriate restaurant based on information on a current position and a traveling direction of the user obtained by a car navigation system and information on a member restaurant DB, a road information DB, and a road traffic information system, displays the information (including congestion) on a user's terminal, and receives reservations is known (for example, refer to JP2002-098537A).

A facility reservation system and a method capable of facilitating from a search of a desired facility to a reservation application on the same homepage and facilitating searching and reserving of another candidate facility even in a case where the reservation is failed are also known (for example, refer to JP2002-197329A).

There are also known an integrated search and reservation system, and an integrated search and reservation method and a server that can be used with not only car navigation systems but also desktop PCs at home as easily as mobile terminals by improving convenience for repeated use by having a database that stores information on stores and services used in the past (for example, refer to JP2005-141657A).

SUMMARY

A facility is reserved in a conversation screen for displaying a conversation between a system and an operator. In this case, in the system adopting a configuration in which the operator can only reserve a facility in the conversation screen, for example, the operator can reserve the facility in the conversation screen after starting a map application separately and confirming a place of the facility, such that many procedures are required to reserve the facility.

Aspects of non-limiting embodiments of the present disclosure relate to an information processing apparatus and a non-transitory computer readable medium storing a program that reduce procedures for reserving a facility in comparison with a case where the operator can only reserve the facility in a conversation screen.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a control section that performs control to display a facility display map including a plurality of display elements indicating a plurality of facilities in a conversation screen displaying a conversation between a system and an operator, and a processing section that, in response to an operation by the operator to select one display element from among the plurality of display elements on the facility display map, performs processing for reserving a facility indicated by the one display element.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the invention will be described in detail with reference to the accompanying drawings.

Overall Configuration of Reservation System

Figure 1:
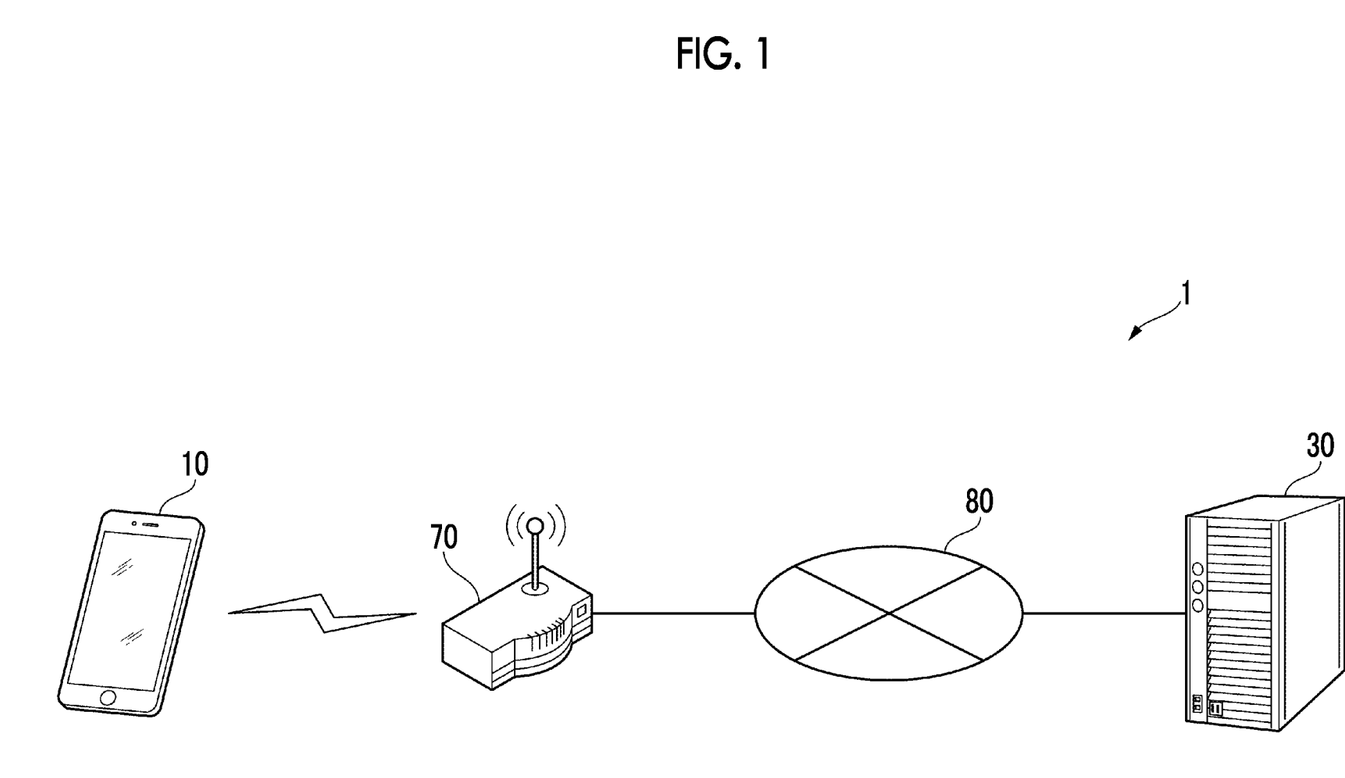
FIG. 1 is a diagram showing an example of an overall configuration of a reservation system to which an exemplary embodiment of the invention is applied.

FIG. 1 is a diagram showing an example of an overall configuration of a reservation system 1 to which the exemplary embodiment is applied. As shown in the drawing, the reservation system 1 includes a portable terminal 10 and a chat server 30. The portable terminal 10 is wirelessly connected to a communication line 80 via an access point 70 by wireless communication such as Wi-Fi (registered trademark). The chat server 30 is connected to the communication line 80. In the drawing, although only one portable terminal 10 and one chat server 30 are shown, one or more may exist. The communication line 80 may be, for example, the Internet.

The portable terminal 10 is a terminal apparatus used by a user of the reservation system 1 to reserve a facility. A chat application is installed in the portable terminal 10. The chat application displays, for example, a message inputted by an operator of the portable terminal 10 in a balloon from a right side of the chat screen, and displays a message inputted by a conversation partner of the operator in a balloon from a left side of the chat screen. In a case where the user of the reservation system 1 reserves a facility, the user reserves the facility as though talking to the system by setting the user's conversation partner as the system by using the chat application. The portable terminal 10 may be realized by, for example, a smartphone. In the exemplary embodiment, the chat screen is used as one example of the conversation screen for displaying a conversation between the system and the operator.

The chat server 30 is a server computer in which a chatbot for realizing conversation on the chat screen of the portable terminal 10 by artificial intelligence (AI) operates. In particular, the chatbot operating in the chat server 30 grasps the user's desire from the conversation on the chat screen of the portable terminal 10 by AI to perform reservation processing of reserving the facility desired by the user among a plurality of facilities. In the exemplary embodiment, the chat server 30 is provided as one example of the information processing apparatus.

Hardware Configuration of Portable Terminal

Figure 2:
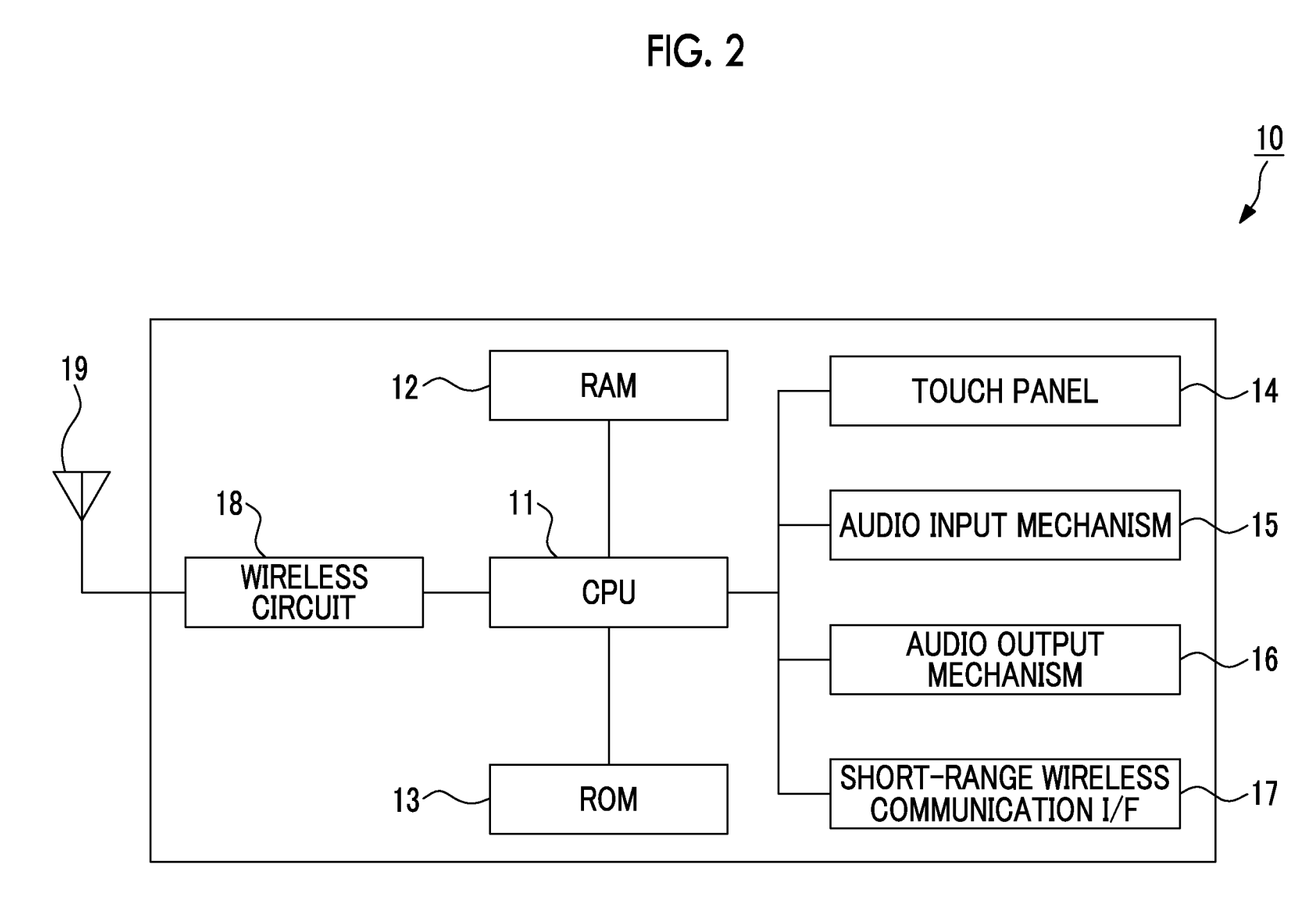
FIG. 2 is a diagram showing an example of a hardware configuration of a portable terminal in the exemplary embodiment of the invention.

FIG. 2 is a diagram showing an example of a hardware configuration of the portable terminal 10 in the exemplary embodiment. As shown in the drawing, the portable terminal 10 is provided with a CPU 11 as an arithmetic means, a RAM 12 and a ROM 13 that are storage means, a touch panel 14 for displaying various information and receiving an input of an operation from a user, an audio input mechanism 15 such as a microphone, an audio output mechanism 16 such as a speaker, and a short-range wireless communication I/F 17 that transmits and receives various types of information to and from other devices by short-range wireless communication such as NFC. Further, the portable terminal 10 is provided with a wireless circuit 18 and an antenna 19 for performing wireless communication via a base station. Here, the wireless circuit 18 includes a baseband LSI (not shown in the drawing) for performing signal processing of digital data that is wirelessly transmitted and received.

Hardware Configuration of Chat Server

Figure 3:
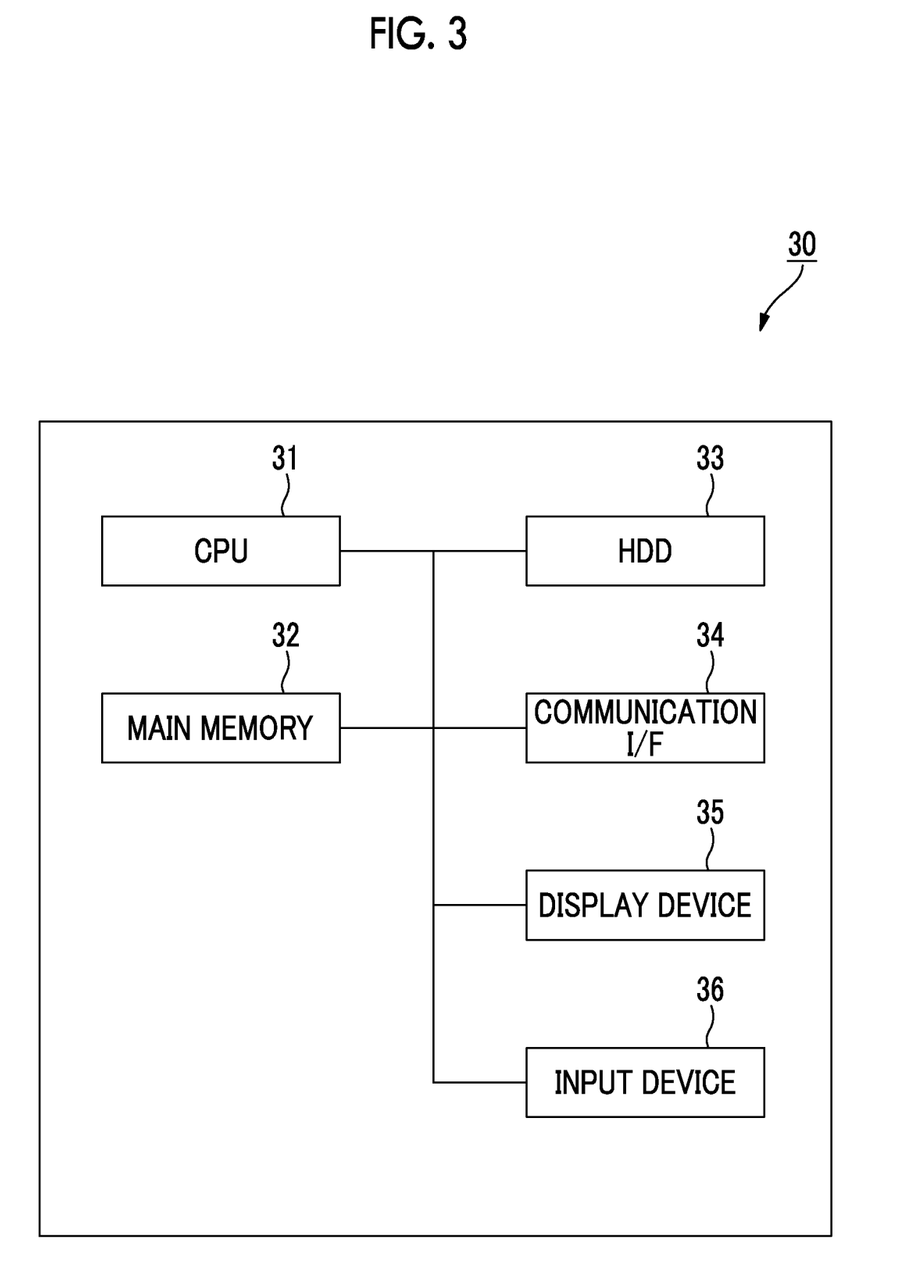
FIG. 3 is a diagram showing an example of a hardware configuration of a chat server in the exemplary embodiment of the invention.

FIG. 3 is a diagram showing an example of a hardware configuration of the chat server 30 in the exemplary embodiment. As shown in the drawing, the chat server 30 is provided with a CPU 31 as an arithmetic means, a main memory 32 and a hard disk drive (HDD) 33 as a storage means. Here, the CPU 31 executes various kinds of software such as an operating system (OS) and an application, and realizes each function described later. The main memory 32 is a storage area for storing such as various kinds of software and data used for executing the software, and the HDD 33 is a storage area for storing such as input data with respect to the various kinds of software and output data from the various kinds of software. Further, the chat server 30 is provided with a communication I/F 34 for communicating with an outside, a display device 35 such as a display, and an input device 36 such as a keyboard and a mouse.

Overview of Exemplary Embodiment

In the exemplary embodiment, in such a reservation system 1, the chat server 30 displays a map including a plurality of display elements indicating a plurality of facilities in the chat screen, and in a case where a user selects a display element from the plurality of display elements, the facility indicated by the selected display element is reserved. That is, in the exemplary embodiment, a map including a plurality of display elements indicating a plurality of facilities is displayed in the conversation screen, and processing of reserving a facility indicated by a display element is performed according to the operation of selecting the display element on the map.

Specific Example of Exemplary Embodiment

Figure 4:
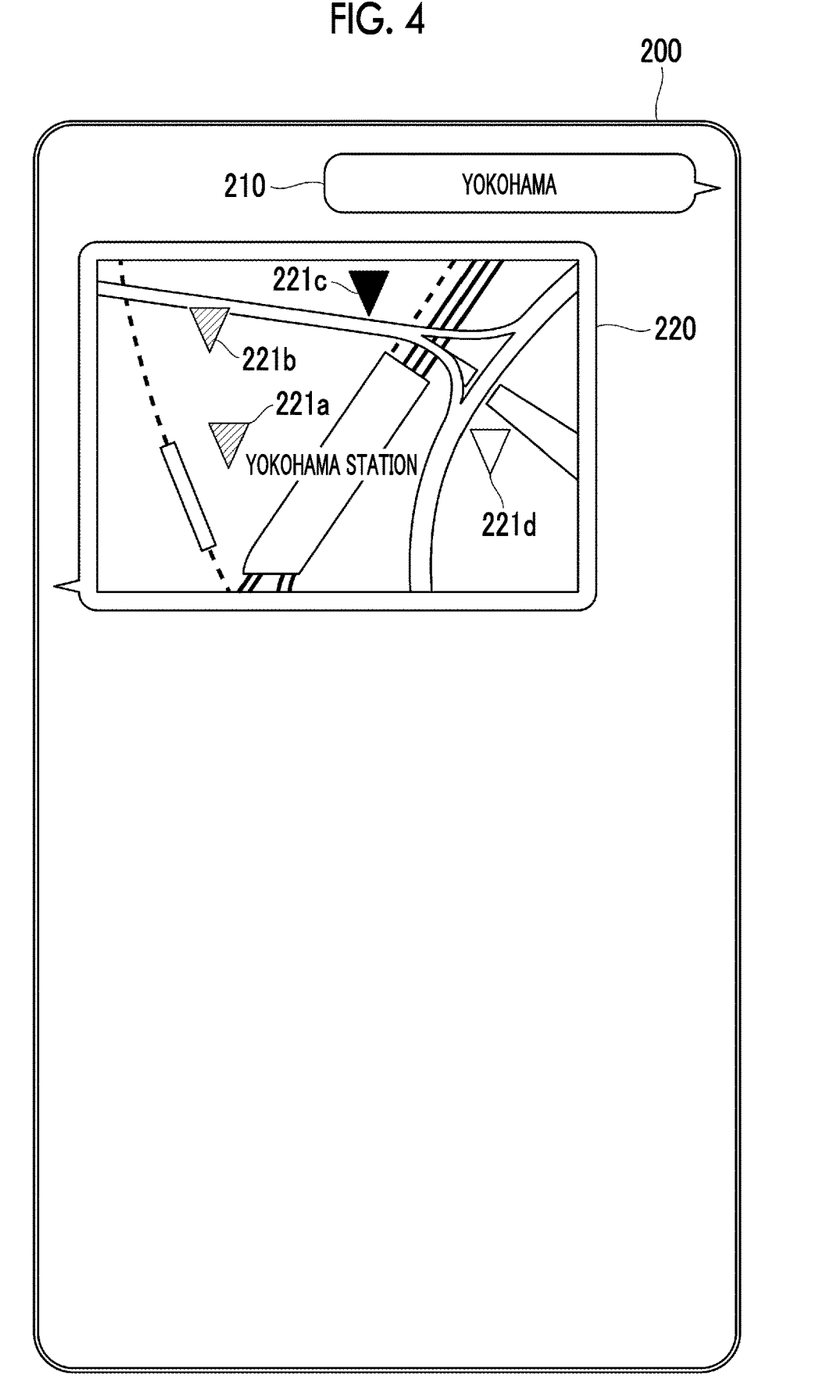
FIG. 4 is a diagram showing an example of a display of a chat screen when a chat server displays a map in a reservation system in the exemplary embodiment.

FIG. 4 is a diagram showing an example of a display of a chat screen 200 when the chat server 30 displays a map in the reservation system 1 in the exemplary embodiment. As shown in the drawing, a user first inputs a place designation message 210 designating "Yokohama" as a place where a facility desired to be reserved exists on the chat screen 200. Then, the chat server 30 displays a map 220 centering on the Yokohama station on the chat screen 200. On the map 220, display elements 221a to 221d indicating positions of facilities are displayed. Here, the display elements 221a to 221d respectively indicate facilities A to D. Further, the display elements 221a and 221b are hatched, but the display element 221c is black and the display element 221d is white. For example, in a case where it is assumed that black represents a reservation rate of 75% or more, hatching represents a reservation rate of 25% or more and less than 75%, and white represents a reservation rate of less than 25%, these display attributes represent a mixed state of the facilities A to D of the day. Alternatively, the display attribute may be changed depending on whether the facilities A to D are able to be currently reserved. Each time the chat screen 200 is updated, the reservation state may be also updated.

Further, the map 220 may be configured to be enlarged. That is, a peripheral area which is previously included in the map 220 may not be included in the map 220 without changing a center and a direction of the map 220. Further, the map 220 may be configured to be reduced in size on the chat screen 200. That is, a peripheral area which is not previously included in the map 220 may be included in the map 220 without changing the center and the direction of the map 220. Furthermore, the range of the map 220 may be configured to be moved. That is, the range of the map 220 may be changed such that an area that is not previously included in the map 220 is included in the map 220 or an area previously included in the map 220 is not included in the map 220, without changing the scale and direction of the map 220.

Figure 5:
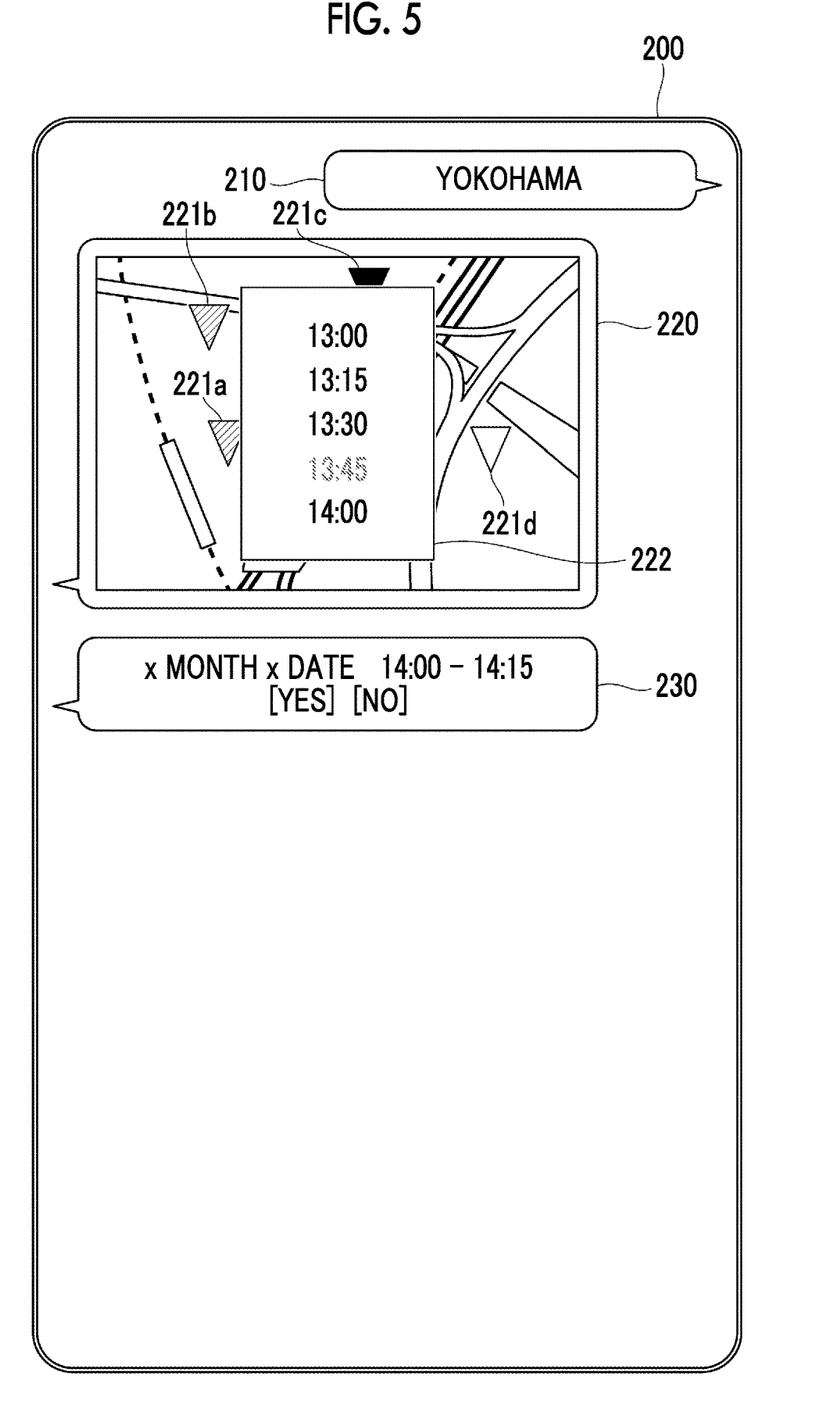
FIG. 5 is a diagram showing an example of a display of a chat screen when a chat server receives a time zone to be reserved in a reservation system in the exemplary embodiment.

FIG. 5 is a diagram showing an example of a display of the chat screen 200 when receiving a time zone to be reserved by the chat server 30 in the reservation system 1 in the exemplary embodiment. As shown in the drawing, a user first performs long-pressing any of the display elements 221a to 221d displayed on the map 220. Here, it is assumed that the display element 221b indicating a facility B is long pressed. Then, the chat server 30 displays, for example, a time menu 222 on the right side of the display element 221b. The time menu 222 is a list of times, and each time indicates the start time of the time zone in the unit of reservation. In the exemplary embodiment, since a working space that is rented as a facility is assumed, the time zone for the reservation unit is set to 15 minutes, but it is not limited thereto. In the time menu 222, a reserved time zone is grayed out. Further, in the drawing, only the time zone from 13:00 to 14:15 is displayed on the time menu 222, but the time menu 222 is scrolled to see a time zone before or after the time zone. Then, the user selects a time zone desired to reserve in the time menu 222. Here, it is assumed that a time zone from 14:00 to 14:15 on the lowermost line of the time menu 222 is selected. Then, the chat server 30 displays a reservation confirmation message 230 for confirming the date and the time zone to be reserved on the chat screen 200.

Figure 6:
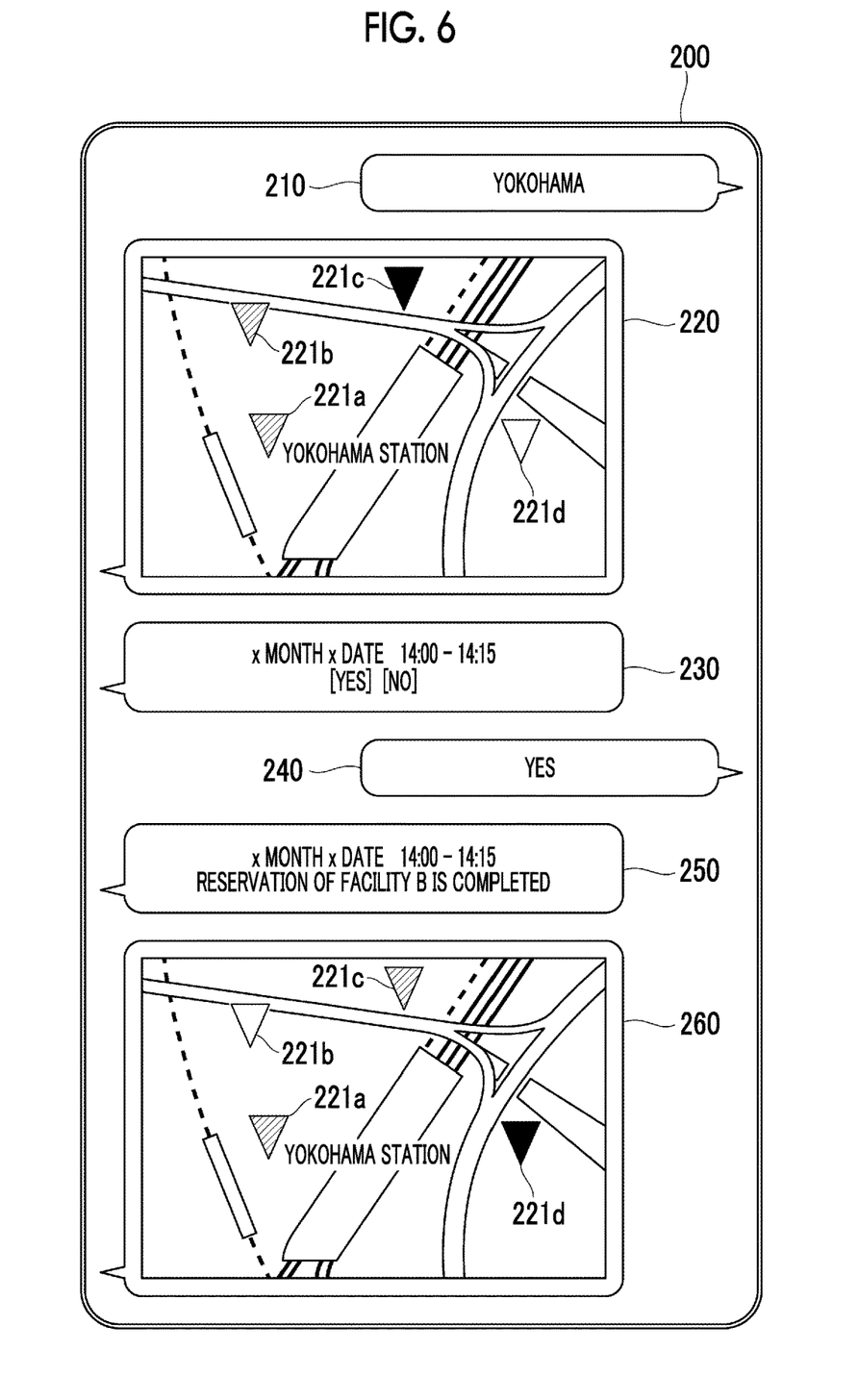
FIG. 6 is a diagram showing an example of a display of a chat screen when a chat server completes a facility reservation and then a user reuses a map in a reservation system in the exemplary embodiment.

FIG. 6 is a diagram showing an example of a display of the chat screen 200 when the chat server 30 completes the facility reservation and then the user reuses the map 220 in the reservation system 1 in the exemplary embodiment. As shown in the drawing, the user first inputs a response message 240 indicating an affirmative response to the reservation confirmation message 230. Then, the chat server 30 displays a reservation completion message 250 indicating the completion of the reservation of the facility B from 14:00 to 14:15. Thereafter, the user selects the map 220 used when reserving the facility in the past. Then, the chat server 30 copies the map 220 to a portion of the latest conversation on the chat screen 200 as a new map 260 thereby reusing the map 220. In this case, the map 260 may be the map 220 updated based on the reservation state at that time. Here, the reservation states of the facilities B to D are different between the map 220 and the map 260. In a case where a plurality of users use one chat application, the map 220 used when another user reserves the facility may be copied as the new map 260 thereby reusing the map 220.

Functional Configuration of Portable Terminal

Figure 7:
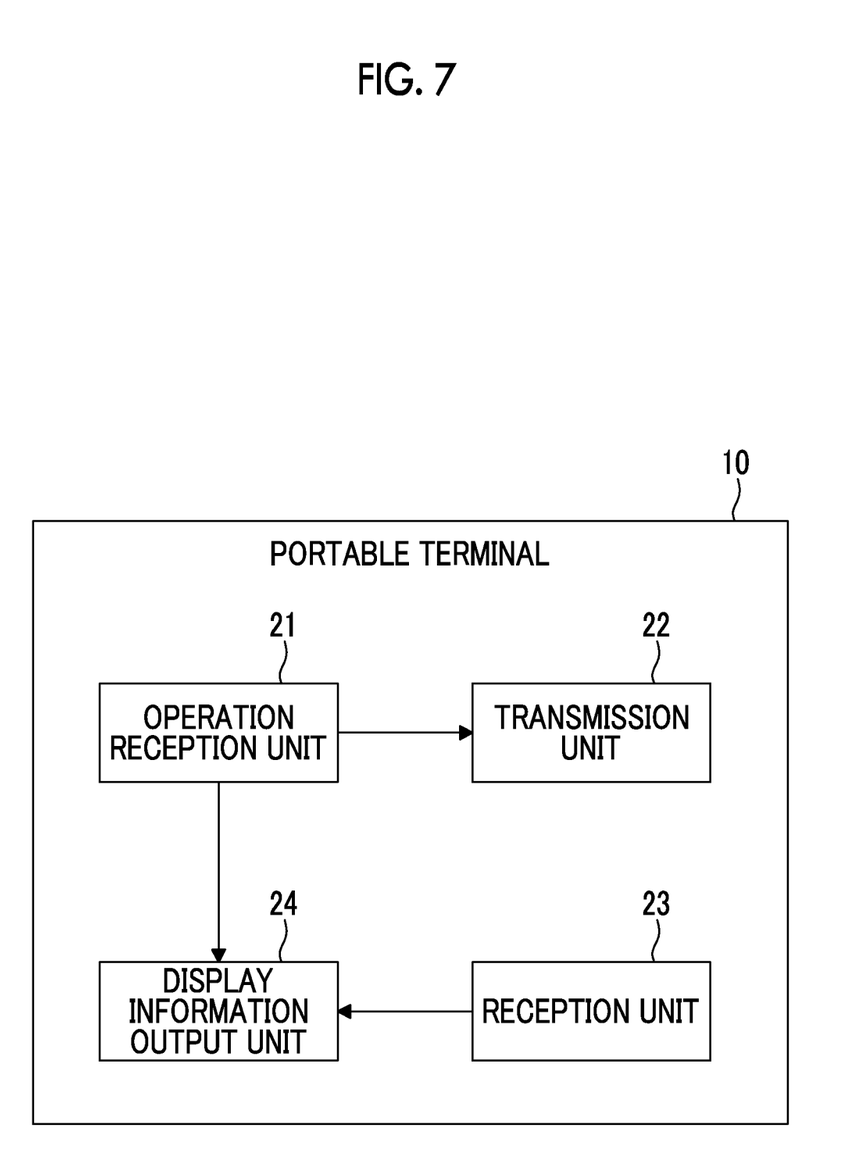
FIG. 7 is a block diagram showing an example of a functional configuration of a portable terminal in the exemplary embodiment of the invention.

FIG. 7 is a block diagram showing an example of a functional configuration of the portable terminal 10 in the exemplary embodiment. As shown in the drawing, the portable terminal 10 according to the exemplary embodiment is provided with an operation reception unit 21, a transmission unit 22, a reception unit 23, and a display information output unit 24.

The operation reception unit 21 receives an operation of a user with respect to the touch panel 14 of the portable terminal 10. Here, the operation of the user includes an operation of inputting a date designation message for designating the date on which a facility is to be reserved, an operation of inputting a place designation message for designating the place where the facility to be reserved exists, an operation of selecting the facility to be reserved, an operation of selecting a time zone to be reserved, an operation of inputting a response message to a reservation confirmation message displayed on the chat screen, an operation of selecting to reuse a map used in the past, and the like.

In a case where the operation reception unit 21 receives the operation of a user who inputs a date designation message and an operation of the user who inputs the place designation message, the transmission unit 22 transmits date information indicating a designated date and place information indicating the designated place to the chat server 30. In a case where the operation reception unit 21 receives the operation of the user who inputs the response message indicating an affirmative response to the reservation confirmation message, reservation request information indicating a reservation request for a selected facility in a selected time zone is transmitted to the chat server 30. Further, in a case where the operation of the user selecting for reusing the map used in the past is received by the operation reception unit 21, information indicating that the map is reused is transmitted to the chat server 30. In this case, the date information and the place information transmitted to the chat server 30 when acquiring the map used in the past are stored on the chat screen, and the date information and the place information are included in the information indicating that the map is reused.

The reception unit 23 receives map information (described later) from the chat server 30. Further, reservation completion information indicating that the facility reservation is completed is received from the chat server 30.

The display information output unit 24 outputs information to be displayed on the chat screen (hereinafter, referred to as "display information") to the touch panel 14. Here, the display information includes a message prepared according to a predetermined logic and a message received by the operation reception unit 21. The former message includes: a date inquiry message for inquiring the date on which the facility is to be reserved, a place inquiry message for inquiring the place where the facility to be reserved exists, a reservation confirmation message for confirming the date and time zone to be reserved, a reservation completion message indicating that the facility reservation is completed, a reservation incompletion message indicating that the facility reservation is not completed, and the like. The latter message includes: the date designation message, the place designation message, the response message to the reservation confirmation message, and the like. Further, the display information also includes a map based on the map information received from the chat server 30 by the reception unit 23. The map based on the map information also includes a map to be reused by updating the map used in the past.

Functional Configuration of Chat Server

Figure 8:
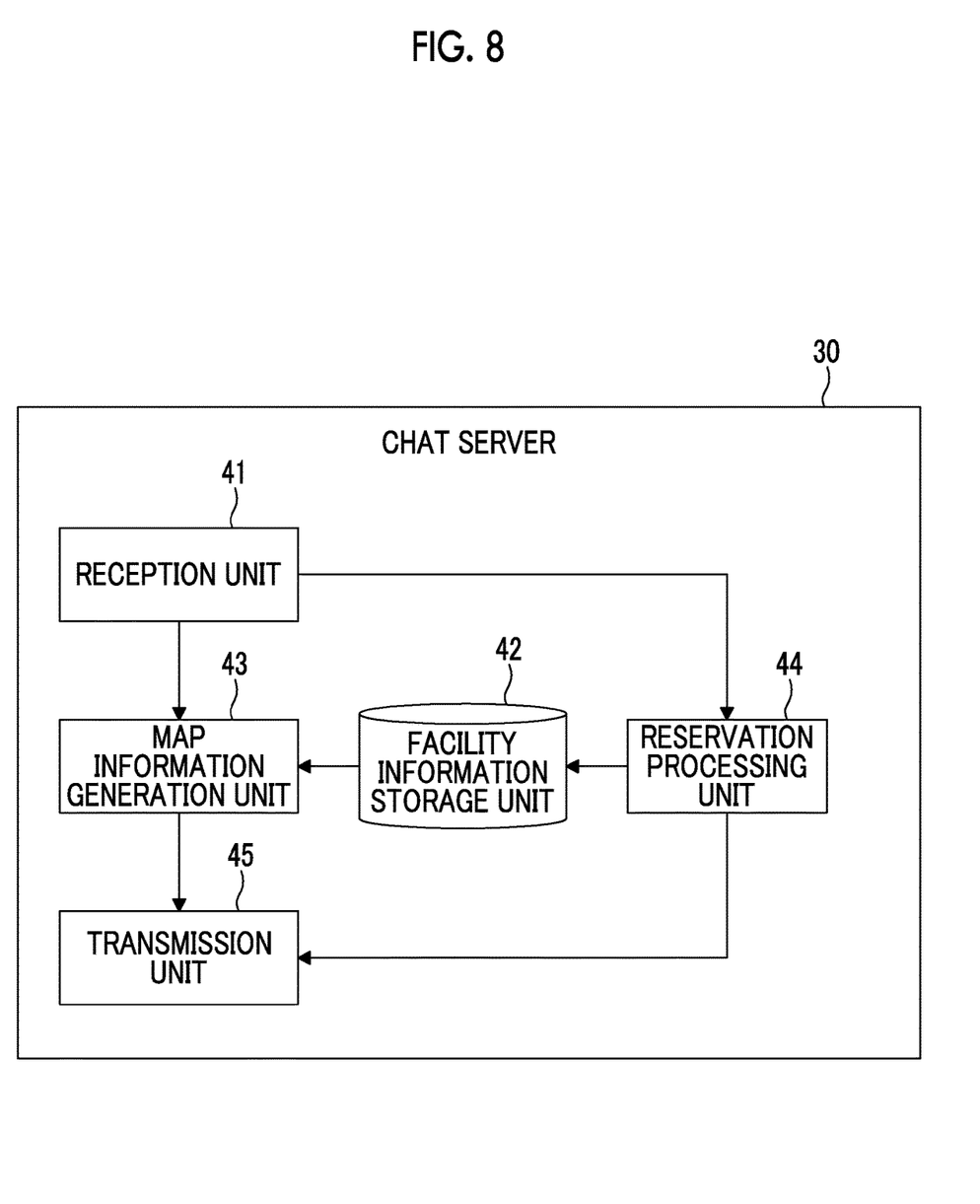
FIG. 8 is a block diagram showing an example of a functional configuration of a chat server in the exemplary embodiment of the invention.

FIG. 8 is a block diagram showing an example of a functional configuration of the chat server 30 in the exemplary embodiment. As shown in the drawing, the chat server 30 according to the exemplary embodiment includes a reception unit 41, a facility information storage unit 42, a map information generation unit 43, a reservation processing unit 44, and a transmission unit 45.

The reception unit 41 receives the date information and the place information from the portable terminal 10. The reservation request information is received from the portable terminal 10. Furthermore, the fact that the map is reused is received from the portable terminal 10. The information indicating that the map is reused also includes the date information and the place information.

The facility information storage unit 42 stores position information indicating a position of a facility for each facility and reservation state information indicating the reservation state for each date and time zone of the facility. The facility information will be described later in detail.

In a case where the reception unit 41 receives the date information and the place information from the portable terminal 10, the map information generation unit 43 generates information (hereinafter, referred to as "map information") for displaying the map acquired by being pasted on the chat screen. Here, the map information may be, for example, data embedded with an API of the map application.

Then, designation information of a position and setting information such as expansion and contraction are associated with the API of the map application. By this, the map data in which the setting of such as expansion or contraction with the designated position as a center is performed is acquired from a site that provides the global map data. Further, in a case where the map is expanded, contracted, or moved as described above, the map data after expansion, contraction, or movement is acquired by the API of the map application by changing the designation information of the position or the setting information such as expansion and contraction. The designation information of the position may be information of latitude and longitude, or information of a place name. The information of the place name may be acquired by the chat server 30 recognizing text of the place designation message. Further, in a case where the designation information of the position or the setting information such as expansion and contraction is changed, the changed information is stored in association with the conversation position, and even in a case where the chat application is restarted, the map may be displayed while maintaining the state.

Further, information (for example, facility features and facility reservation state) of the plurality of facilities is also associated with the API of the map application. In this case, as the information of the plurality of facilities, the information of the facilities existing within the range of the place indicated by the place information may be associated. Further, as the reservation state of the facility, the reservation state on the date indicated by the date information may be associated. For example, reservation state information indicating the reservation state may be associated with the plurality of display elements indicating the plurality of facilities. In this case, the display element for associating the reservation state information may be a portion of the plurality of display elements indicating the plurality of facilities. That is, the reservation state information indicating the reservation state may be associated with the display element indicating at least one of the plurality of facilities. By this, facility map data obtained by superimposing the plurality of display elements indicating the plurality of facilities on the map based on the acquired map data is acquired. Note that, processing itself for superimposing the plurality of display elements indicating the plurality of facilities on the map is realized by using a function of the map application. In the exemplary embodiment, as an example of the facility display map including the plurality of display elements indicating the plurality of facilities, the facility map data is used, and as an example of a control section that controls to display the facility display map in the conversation screen, and as an example of a control section for controlling to display the facility display map in which the reservation state of at least one facility among the plurality of facilities is respectively associated with at least one display element indicating at least one facility in the conversation screen, the map information generation unit 43 is provided.

Here, as a method of associating the reservation state information with the display element indicating at least one facility among the plurality of facilities, firstly, there is a method of using an attribute of the display element. For example, as described with reference to FIG. 4, it is a method in which, in a case where the reservation rate of a certain facility is 75% or more, the display element indicating the facility is painted black, in a case where the reservation rate is 25% or more and less than 75%, the display element indicating the facility is hatched, and in a case where the reservation rate is less than 25%, the display element indicating the facility is white. In this case, the map information generation unit 43 is one example of a control section that associates the reservation state of each facility of at least one facility with the display element indicating each facility by the attribute of the display element.

Further, as a method of associating the reservation state information with the display element indicating at least one facility among the plurality of facilities, secondly, there is a method of using information displayed by the operation of selecting the display element. For example, it is a method in which, in a case where the operation of selecting the display element indicating a certain facility is performed as described with reference to FIG. 5, a time zone in which the facility is not able to be reserved is grayed out. In this case, the map information generation unit 43 is one example of a control section that associates the reservation state of each facility of at least one facility with the display element indicating each facility by displaying the display element according to the operation of selecting the display element.

Further, the map information generation unit 43 generates map information in a case where the reception unit 41 receives information indicating that the map is to be reused, in particular, in order to reuse the map used in the past on the chat screen. Here, the map to be reused may be the map used when the reservation is established in the past. Further, in a case where the plurality of users use one chat application, map information may be generated to cause another user to reuse the map used in the past by the user on the chat screen. In this case, the map information generation unit 43 is one example of a control section that controls to display a new facility display map based on the facility display map in the conversation screen according to the operation of the operator who selects the facility display map displayed in the conversation screen or another operator.

In this case, the map information generation unit 43 may generate map information such that conditions used in searching facilities in the past are able to be stored at places where the API of the map application on the chat screen is pasted and this is able to be used by copy and paste. In this case, the map information generation unit 43 is an example of a control section that controls the conditions used when the operator searches for the plurality of facilities on the facility display map to be stored in association with the facility display map such that the conditions are able to be reused when the operator or another operator searches for the plurality of facilities on the new facility display map.

The map information generation unit 43 may update the reservation state information of the facility indicated by each display element associated with the plurality of display elements included in the map used in the past to the information at the time of reuse. In this case, the display element for associating the reservation state information may be a part of the plurality of display elements indicating the plurality of facilities. That is, the reservation state information of at least one facility may be updated to the information at the time of reuse in a state where the reservation state information indicating the reservation state is associated with the display element indicating at least one facility among the plurality of facilities. In this case, the map information generation unit 43 is an example of a control section that controls to display the facility display map in which the reservation state of at least one facility of the plurality of facilities is respectively associated with at least one display element indicating the at least one facility, and controls such that a new facility display map in which the reservation state of at least one facility when a new facility display map is displayed in the conversation screen is respectively associated with the at least one display element is displayed in the conversation screen.

In a case where the reception unit 41 receives the reservation request information from the portable terminal 10, the reservation processing unit 44 performs reservation processing of reserving the designated facility for the designated date and time zone. Specifically, the reservation state information corresponding to the designated facility and the designated date and time zone is updated in the facility information stored in the facility information storage unit 42. In the exemplary embodiment, the reservation processing unit 44 is provided as one example of a processing section that performs processing for reserving the facility indicated by one display element according to the operation of the operator selecting one display element from among the plurality of display elements on the facility display map displayed in the conversation screen.

The transmission unit 45 transmits the map information generated by the map information generation unit 43 to the portable terminal 10. Further, the reservation completion information indicating the completion of the facility reservation by the reservation processing unit 44 is transmitted to the portable terminal 10.

Figure 9:
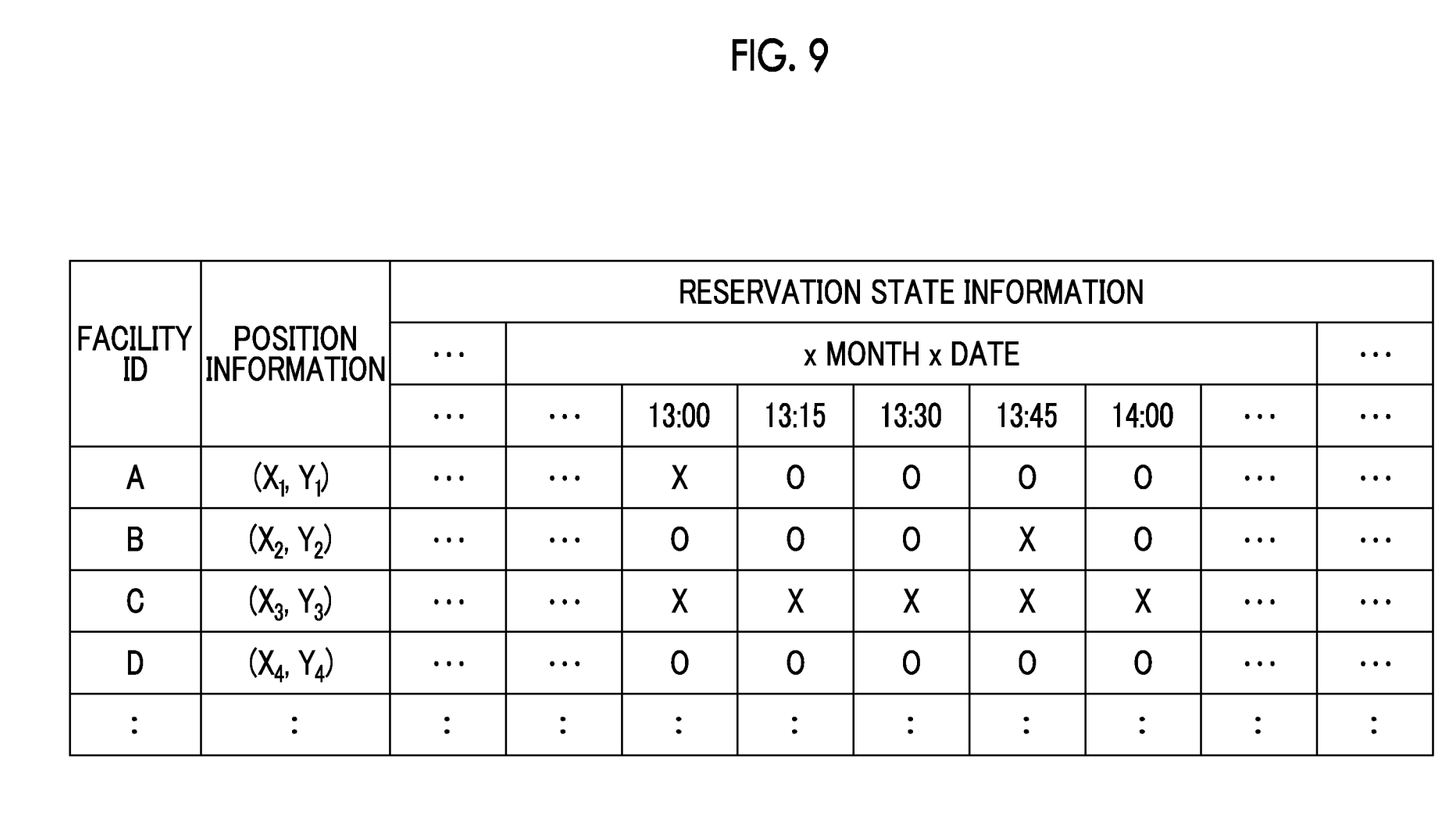
FIG. 9 is a diagram showing an example of facility information stored in a facility information storage unit of a chat server in the exemplary embodiment of the invention.

FIG. 9 is a diagram showing an example of the facility information stored in the facility information storage unit 42. As shown in the drawing, the facility information is obtained by associating a facility ID, position information, and reservation state information.

The facility ID is information for uniquely identifying the facility. The facilities of the facility ID "A" to "D" correspond to the facilities A to D mentioned in FIGS. 4 to 6.

The position information is information indicating the position of the facility. Here, although the latitude and the longitude are assumed as the position information, the address may be also stored as the position information.

The reservation state information is information indicating the reservation state of the facility for each date and time zone. As described above, each time zone is assumed to be 15 minutes, and the heading of each time zone is indicated by the start time of the time zone. Further, in each time zone, "○" indicates that there is a vacancy in the facility, and "×" indicates that there is no vacancy in the facility (reserved). For example, since the facility B is not able to be reserved for 13:45 to 14:00 within the time range shown in the drawing, only this time zone is grayed out in the time menu 222 for the facility B in FIG. 5.

Operation of Reservation System

Figure 10:
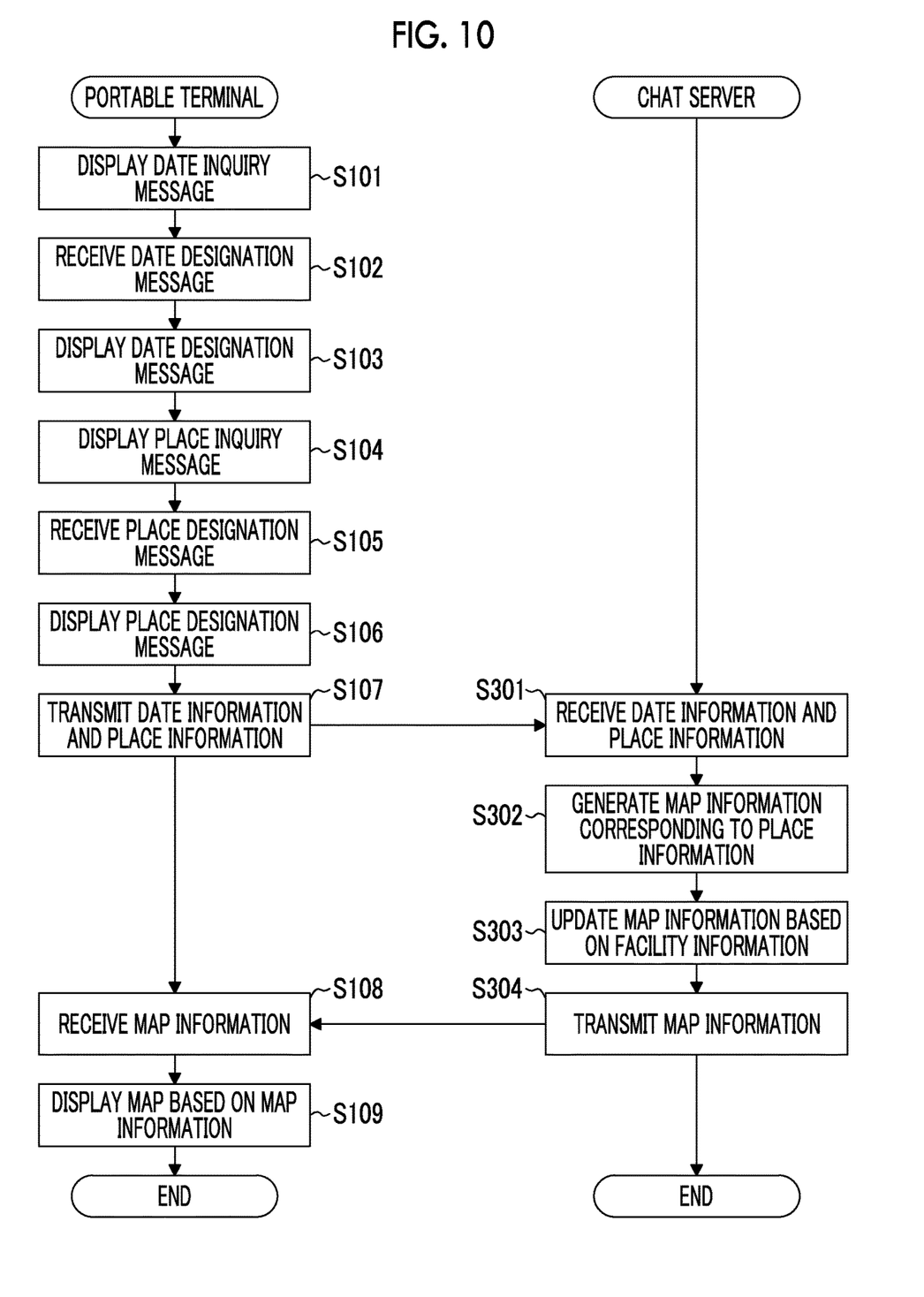
FIG. 10 is a flowchart showing an example of an operation of a reservation system when displaying a map on a portable terminal in the exemplary embodiment of the invention.

FIG. 10 is a flowchart showing an example of an operation of the reservation system 1 when displaying the map on the portable terminal 10. This is an example of the operation until the map 220 is displayed in a case where FIG. 4 is exemplified. In a case where a user starts the chat application with the portable terminal 10 and performs any operation as some kind of trigger indicating that the user wants to reserve the facility, the operation is started. Here, the trigger may be, for example, inputting a message indicating that the facility is desired to be reserved, or may be pressing a button indicating that the facility displayed on the chat screen is desired to be reserved. Alternatively, in a case where the chat application is an application dedicated to the reservation of the facility, the start of the chat application may be also used as the trigger.

Although not shown in FIG. 4, in a case where the operation is started, the portable terminal 10 displays the date inquiry message for inquiring the date on which a user wants to reserve the facility on the chat screen (Step S101). Specifically, the display information output unit 24 outputs the date inquiry message to the touch panel 14 so as to be displayed on the chat screen. Alternatively, the portable terminal 10 may first display a message inquiring whether a user wants to make a reservation today on the chat screen, and display a message inquiring the date on the chat screen in a case where the user inputs a response message indicating a negative response with respect to the message.

In response to this, in a case where a user inputs the date designation message for designating the date on which the user wants to reserve the facility to the chat application, the portable terminal 10 receives the date designation message (Step S102). Specifically, the operation reception unit 21 receives the date designation message. Alternatively, in a case where a user inputs the response message indicating the affirmative response to the above-described message inquiring whether the user wants to make a reservation for today, the portable terminal 10 may receive the response message as the date designation message which designates the today's date as the date to be reserved.

Although not shown in FIG. 4, the portable terminal 10 displays the date designation message received in Step S102 on the chat screen (Step S103). Specifically, the display information output unit 24 outputs the date designation message received by the operation reception unit 21 to the touch panel 14 so as to be displayed on the chat screen.

Next, although not shown in FIG. 4, the portable terminal 10 displays the place inquiry message for inquiring the place where the facility desired to be reserved exists on the chat screen (Step S104). Specifically, the display information output unit 24 outputs the place inquiry message to the touch panel 14 so as to be displayed on the chat screen.

In response to this, in a case where the place designation message for designating the place where the facility desired to be reserved by a user exists is inputted to the chat application, the portable terminal 10 receives the place designation message (Step S105). Specifically, the operation reception unit 21 receives the place designation message.

As shown in FIG. 4, the portable terminal 10 displays the place designation message received in Step S105 on the chat screen (Step S106). Specifically, the display information output unit 24 outputs the place designation message received by the operation reception unit 21 to the touch panel 14 so as to be displayed on the chat screen.

Thereafter, the portable terminal 10 transmits the date information indicating the date designated by the date designation message displayed in Step S103 and the place information indicating the place designated by the place designation message displayed in Step S106 to the chat server (Step S107). Specifically, the transmission unit 22 transmits the date information indicating the date designated by the date designation message received by the operation reception unit 21 and the place information indicating the place designated by the place designation message received by the operation reception unit 21 to the chat server 30.

By this, the chat server 30 receives the date information and the place information transmitted in Step S107 from the portable terminal 10 (Step S301). Specifically, the reception unit 41 receives the date information and the place information transmitted by the transmission unit 22 of the portable terminal 10.

Next, the chat server 30 generates the map information corresponding to the place information received in Step S301 (Step S302). Specifically, the map information generation unit 43 generates data in which the API of the map application is embedded. Then, the designation information of the place determined based on the received place information is associated with the data, thereby obtaining the map information for acquiring the map data of the place indicated by the place information. The map information may be associated with the setting information such as the expansion and contraction. As the setting information, predetermined information may be used, or information determined based on the received place information may be used.

Then, the chat server 30 updates the map information generated in Step S302 based on the facility information stored in the facility information storage unit 42 (Step S303). Specifically, the map information generation unit 43 extracts the information of the facility within the range of the place indicated by the place information received in Step S301 from the facility information stored in the facility information storage unit 42. In order to acquire the facility map data in which the display elements indicating the facilities are superimposed to be displayed, the facility information is associated with the map information generated in Step S302. In this case, the display element may be associated with the reservation state information on the date indicated by the date information received in Step S301 among the facility ID of the facility and the reservation state information of the facility.

Thereafter, the chat server 30 transmits the map information generated in Step S302 and updated in Step S303 to the portable terminal 10 (Step S304). Specifically, the transmission unit 45 transmits the map information generated by the map information generation unit 43 to the portable terminal 10.

By this, the portable terminal 10 receives the map information transmitted in Step S304 from the chat server 30 (Step S108). Specifically, the reception unit 23 receives the map information transmitted by the transmission unit 45 of the chat server 30.

Then, the portable terminal 10 displays the map based on the map information received in Step S108 on the chat screen as shown in FIG. 4 (Step S109). Specifically, the display information output unit 24 outputs the map based on the map information received by the reception unit 23 to the touch panel 14 so as to be displayed on the chat screen.

Figure 11:
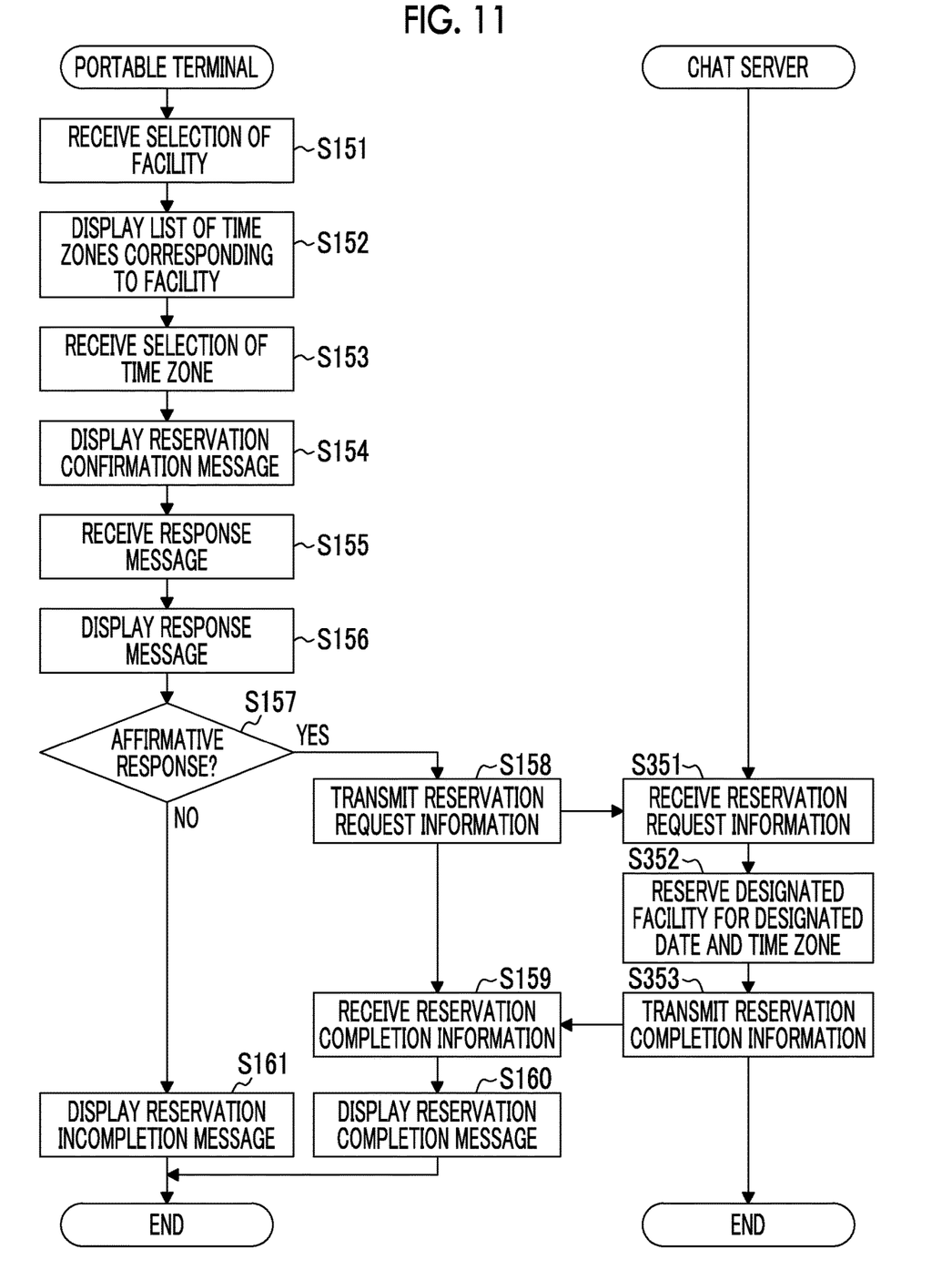
FIG. 11 is a flowchart showing an example of an operation of a reservation system when reserving a facility in the exemplary embodiment of the invention.

FIG. 11 is a flowchart showing an example of the operation of the reservation system 1 when reserving the facility. This is an example of the operation from the selection of the display element 221b in FIG. 5 to the display of the reservation completion message 250 in FIG. 6 when FIGS. 5 and 6 are exemplified. In a case where a user performs the operation to select the facility desired to be reserved on the map of the chat screen, the operation is started. Here, the selected operation may be, for example, an operation of long-pressing the display element indicating the facility desired to be reserved.

In a case where the operation is started, the portable terminal 10 receives the selection of the facility (Step S151). Specifically, the operation reception unit 21 receives, for example, the operation of long-pressing the display element indicating the facility, and specifies the facility ID of the facility associated with the display element.

Next, the portable terminal 10 displays the list of time zones corresponding to the facility selected in Step S151 on the chat screen as shown in FIG. 5 (Step S152). Specifically, the display information output unit 24 acquires the display information for displaying the list of time zones corresponding to the facility, and outputs the display information to the touch panel 14 so as to be displayed on the chat screen. At this time, the reserved time zones among the plurality of time zones may be grayed out and displayed. Here, whether each time zone is able to be reserved may be determined based on the reservation state information associated with the display element.

In response to this, in a case where a user selects the time zone on which the user wants to reserve the facility from the list of time zones displayed in Step S152, the portable terminal 10 receives the selection of the time zone (Step S153). Specifically, the operation reception unit 21 receives the selection of the time zone from the list of time zones displayed on the chat screen.

Then, as shown in FIG. 5, the portable terminal 10 displays the reservation confirmation message for confirming whether the facility is able to be reserved on the date selected in Step S102 and the time zone selected in Step S153 on the chat screen (Step S154). Specifically, the display information output unit 24 outputs the reservation confirmation message to the touch panel 14 so as to be displayed on the chat screen.

In response to this, in a case where a user inputs the response message to the chat application, the portable terminal 10 receives the response message (Step S155). Specifically, the operation reception unit 21 receives the response message to the reservation confirmation message displayed on the chat screen.

The portable terminal 10 displays the response message received in Step S155 on the chat screen (Step S156). Specifically, the display information output unit 24 outputs the response message received by the operation reception unit 21 to the touch panel 14 so as to be displayed on the chat screen.

At this time, a user inputs the response message indicating the affirmative response to the chat application in a case of reserving the facility, and inputs the response message indicating the negative response to the chat application in a case of not reserving the facility. Then, the portable terminal 10 determines whether the response message displayed in Step S156 indicates the affirmative response (Step S157). Specifically, the operation reception unit 21 determines whether the response message indicating the affirmative response is received.

As a result, in a case where it is determined that the response message in Step S157 indicates the affirmative response as shown in FIG. 6, the portable terminal 10 transmits the reservation request information for requesting reservation of the facility under the conditions indicated in the reservation confirmation message to the chat server 30 (Step S158). Specifically, the transmission unit 22 transmits the reservation request information including the facility ID specified in Step S151, the date designated in Step S102, and the time zone selected in Step S153 to the chat server 30.

By this, the chat server 30 receives the reservation request information from the portable terminal 10 (Step S351). Specifically, the reception unit 41 receives the reservation request information transmitted by the transmission unit 22 of the portable terminal 10. Here, the reservation request information includes the facility ID specified in Step S151, the date designated in Step S102, and the time zone selected in Step S153.

Then, the chat server 30 performs reservation processing of reserving the facility designated by the reservation request information for the date and time zone designated by the reservation request information (Step S352). Specifically, the reservation processing unit 44 reserves the facility identified by the facility ID included in the reservation request information received by the reception unit 41 for the date and time zone included in the reservation request information received by the reception unit 41. That is, "x" is stored in the column of the date and time zone in the row including the facility ID of the facility information shown in FIG. 9.

Thereafter, the chat server 30 transmits the reservation completion information indicating the completion of the reservation processing in Step S352 to the portable terminal 10 (Step S353). Specifically, the transmission unit 45 transmits the reservation completion information to the portable terminal 10.

By this, the portable terminal 10 receives the reservation completion information transmitted in Step S353 from the chat server 30 (Step S159). Specifically, the reception unit 23 receives the reservation completion information transmitted by the transmission unit 45 of the chat server 30.

Then, as shown in FIG. 6, the portable terminal 10 displays the reservation completion message based on the reservation completion information received in Step S159 on the chat screen (Step S160). Specifically, the display information output unit 24 outputs the reservation completion message based on the reservation completion information received by the reception unit 23 to the touch panel 14 so as to be displayed on the chat screen.

On the other hand, in a case where it is determined that the response message in Step S157 indicates the negative response, although not shown in FIG. 6, the portable terminal 10 displays the reservation incompletion message indicating that the reservation processing for the facility is not completed (Step S161). Specifically, the display information output unit 24 outputs the reservation incompletion message to the touch panel 14 so as to be displayed on the chat screen.

Modification of Exemplary Embodiment

In the above description, although the chat server 30 transmits the map information for acquiring and displaying the facility map data obtained by superimposing the plurality of display elements indicating the plurality of facilities on the map of the designated place to the portable terminal 10, it is not limited to this.

It is also conceivable that the chat server 30 first transmits the map information for acquiring and displaying the map of the designated place to the portable terminal 10, and then transmits the information for superimposing the plurality of display elements indicating the plurality of facilities on the map to the portable terminal 10. In this case, the map information generation unit 43 is an example of a control section that controls the facility display map to be displayed in the conversation screen by performing control to display the map that does not include the plurality of display elements in the conversation screen, and then performing control to display the plurality of display elements on the map.

By the way, in a case of performing such an operation, several methods are considered as acquisition methods of information for superimposing the plurality of display elements indicating the plurality of facilities.

First, there is a method in which a user inputs "near here" without designating the position on the map to acquire the information. In this case, in a case where the reception unit 41 receives the information indicating that the user inputs "near here", the map information generation unit 43 acquires the information for superimposing the display elements indicating the facilities within a predetermined range around the user's current position. Here, the current position of a user may be acquired by using, for example, a GPS. In this case, the map information generation unit 43 is one example of a control section for searching the plurality of facilities based on the current position of the operator and controlling to display the plurality of display elements indicating the plurality of facilities on the map.

Second, there is a method in which a user designates a position on the map and inputs "near here" to acquire the information. In this case, in a case where the reception unit 41 receives the position designated by the user and the information indicating that the user inputs "near here", the map information generation unit 43 acquires the information for superimposing the display elements indicating the facilities within a predetermined range around the position designated by the user. Here, the position designated by the user may be acquired, for example, by calling the API of the map application. Alternatively, the place name of the position on the map may be acquired by the text recognition. In this case, the map information generation unit 43 is one example of a control section for searching the plurality of facilities based on the position designated by the operator and controlling to display the plurality of display elements indicating the plurality of facilities on the map.

Program

The processing performed by the chat server 30 in the exemplary embodiment is prepared as a program such as application software.

That is, the program for realizing the exemplary embodiment is regarded as a program for causing a computer to realize a function of controlling to display the facility display map including the plurality of display elements indicating the plurality of facilities in the conversation screen that displays the conversation between the system and the operator, and a function of performing processing of reserving the facility indicated by one display element according to the operation of the operator who selects one of the plurality of display elements on the facility display map displayed in the conversation screen.

The program for realizing the exemplary embodiment may be provided not only by communication means but also by storing the program in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
perform control to display a facility display map including a plurality of display elements indicating a plurality of facilities in a conversation screen displaying a conversation between a system and an operator; and
in response to an operation by the operator to select one display element from among the plurality of display elements on the facility display map initially in the conversation screen, perform processing for reserving a facility indicated by the one display element, wherein the display elements comprises icons for representing positions of the plurality of facilities, the processor further configured to change the icons according to reservation states of the plurality of facilities.

2. The information processing apparatus according to claim 1,
wherein the processor further configured to perform control to display the facility display map in the conversation screen by performing control to display a map not including the plurality of display elements in the conversation screen and then performing control to display the plurality of display elements on the map.

3. The information processing apparatus according to claim 2,
wherein the processor further configured to search for the plurality of facilities based on a current position of the operator and performs is control to display the plurality of display elements indicating the plurality of facilities on the map.

4. The information processing apparatus according to claim 2,
wherein the processor further configured to search for the plurality of facilities based on a position designated by the operator and performs control to display the plurality of display elements indicating the plurality of facilities on the map.

5. The information processing apparatus according to claim 1,
wherein the processor further configured to perform control to display the facility display map in which a reservation state of at least one facility among the plurality of facilities is respectively associated with at least one display element indicating the at least one facility in the conversation screen.

6. The information processing apparatus according to claim 5,
wherein the processor further configured to associate the reservation state of each facility of the at least one facility with the display element indicating each facility by an attribute of the display element.

7. The information processing apparatus according to claim 5,
wherein the processor further configured to associate the reservation state of each facility of the at least one facility with the display element indicating each facility by displaying the reservation state according to an operation of selecting the display element.

8. The information processing apparatus according to claim 1,
wherein the processor further configured to perform control to display a new facility display map based on the facility display map in the conversation screen according to an operation of the operator or another operator who selects the facility display map displayed in the conversation screen.

9. The information processing apparatus according to claim 8,
wherein the processor further configured to perform control to store conditions used when the operator searches for the plurality of facilities on the facility display map in association with the facility display map such that the conditions are able to be reused when the operator or the other operator searches for the plurality of facilities on the new facility display map.

10. The information processing apparatus according to claim 8,
wherein the processor further configured to perform control to display the facility display map in which a reservation state of at least one facility of the plurality of facilities is respectively associated with at least one display element indicating the at least one facility, and performs control to display the new facility display map in which the reservation state of the at least one facility when the new facility display map is displayed in the conversation screen is respectively associated with the at least one display element in the conversation screen.

11. A non-transitory computer readable medium storing a program causing a computer to realize:
a function of performing control to display a facility display map including a plurality of display elements indicating a plurality of facilities in a conversation screen that displays a conversation between a system and an operator; and
a function of, according to an operation by the operator to select one display element from among the plurality of display elements on the facility display map initially in the conversation screen, performing processing for reserving a facility indicated by the one display element, wherein the display elements comprises icons for representing positions of the plurality of facilities, the icons is changed according to reservation states of the plurality of facilities.

* * * * *